United States Patent
Goldston et al.

(10) Patent No.: US 6,452,977 B1
(45) Date of Patent: Sep. 17, 2002

(54) METHOD AND APPARATUS FOR AM COMPATIBLE DIGITAL BROADCASTING

(75) Inventors: Don Roy Goldston, Mason, OH (US); David Carl Hartup, West Chester, OH (US); Marcus McLenn Matherne, West Chester, PA (US)

(73) Assignee: Ibiquity Digital Corporation, Columbia, MD (US)

( * ) Notice: Subject to any disclaimer, the term of this patent is extended or adjusted under 35 U.S.C. 154(b) by 0 days.

(21) Appl. No.: 09/153,637

(22) Filed: Sep. 15, 1998

(51) Int. Cl.[7] .......................... H04K 1/10; H04L 27/18; H04L 27/28; H03C 5/00

(52) U.S. Cl. ...................... 375/260; 375/269; 375/298; 375/295; 375/316; 375/320; 375/329; 370/204

(58) Field of Search ................................ 375/260, 261, 375/269, 279, 280, 281, 259, 231, 295, 298, 300, 308, 316, 320, 324, 329, 332, 216; 332/103, 149; 329/304, 347; 370/203, 204, 206, 208; 455/59, 108, 110

(56) References Cited

U.S. PATENT DOCUMENTS

| | | | |
|---|---|---|---|
| 5,559,830 A | 9/1996 | Dapper et al. | 375/230 |
| 5,588,022 A | 12/1996 | Dapper et al. | 375/216 |
| 5,606,576 A | 2/1997 | Dapper et al. | 375/268 |
| 5,633,896 A | 5/1997 | Carlin et al. | 375/340 |
| 5,652,772 A | 7/1997 | Isaksson et al. | 375/367 |
| 5,673,292 A | 9/1997 | Carlin | 375/269 |
| 5,703,954 A | 12/1997 | Dapper et al. | 381/15 |
| 5,732,113 A | 3/1998 | Schmidl et al. | 375/355 |

(List continued on next page.)

FOREIGN PATENT DOCUMENTS

WO  9749207  12/1997

OTHER PUBLICATIONS

B. Kroeger, A. Vigil, "Improved IBOC DAB Technology For AM and FM Broadcasting", Oct. 1996.
M. Alard, R. Lassale, "Principles of modulation and channel coding for digital broadcasting for mobile receivers", EBU Review, No. 224, pp. 168–190, Aug. 1987.
Kroeger, B.W., Peyla, P.J., Robust IBOC DAB AM and FM Technology For Digital Audio Broadcasting, Apr. 1997.
A. J. Vigil, "Wireless Data Transmission Through In–Band On–Channel Digital Audio Broadcasting," Proceedings of the SPIE, vol. 2601, pp. 105–114, Oct. 23, 1995.

Primary Examiner—Betsy L. Deppe

(57) ABSTRACT

A broadcasting method for simultaneously broadcasting analog and digital signals in a standard AM broadcasting channel is provided by: broadcasting an amplitude modulated radio frequency signal having a first frequency spectrum, wherein the amplitude modulated radio frequency signal includes a first carrier at a frequency of $f_0$ modulated by an analog program signal representative of program material; and simultaneously broadcasting a plurality of digitally modulated orthogonal frequency division multiplexed carrier signals within a frequency range of about $f_0 \pm 15$ kHz, which encompasses the first frequency spectrum, each of the digitally modulated carrier signals being modulated by a portion of a digital program signal, wherein the digital signal includes a digital representation of the program material, additional data, or a combination of the program material and the additional data. A first group of the digitally modulated carrier signals lying within the first frequency spectrum are modulated in-quadrature with the first carrier signal, and second and third groups of the digitally modulated carrier signals lie outside of the first frequency spectrum and are modulated both in-phase and in-quadrature with the first carrier signal. A training sequence of known data is periodically transmitted using selected ones of the digitally modulated carrier signals. Transmitters and receivers which operate in accordance with the above method are also provided.

44 Claims, 5 Drawing Sheets

U.S. PATENT DOCUMENTS

| | | | |
|---|---|---|---|
| 5,757,854 A | | 5/1998 | Hunsinger et al. |
| 5,764,706 A | | 6/1998 | Carlin et al. ................. 375/326 |
| 5,809,065 A | | 9/1998 | Dapper et al. .............. 375/215 |
| 5,930,687 A | * | 7/1999 | Dapper et al. .............. 455/108 |
| 5,940,365 A | * | 8/1999 | Takegahara et al. ........ 370/208 |
| 5,949,796 A | | 9/1999 | Kumar |
| 5,956,373 A | * | 9/1999 | Goldston et al. ............ 375/298 |
| 6,035,000 A | * | 3/2000 | Bingham ..................... 375/296 |
| 6,128,334 A | * | 10/2000 | Dapper et al. .............. 375/216 |
| 6,175,550 B1 | * | 1/2001 | van Nee ..................... 370/206 |
| 6,243,424 B1 | * | 6/2001 | Kroeger et al. ............. 375/265 |

\* cited by examiner

METHOD AND APPARATUS FOR AM COMPATIBLE DIGITAL BROADCASTING

BACKGROUND OF THE INVENTION

This invention relates to radio broadcasting and, more particularly, to methods of and apparatus for broadcasting digitally modulated signals and analog amplitude modulated signals within the same frequency channel assignment.

There has been increasing interest in the possibility of broadcasting digitally encoded audio signals to provide improved audio fidelity. Several approaches have been suggested, including out-of-band techniques in which the digital radio signals would be broadcast in a specially designated frequency band, and in-band techniques in which the radio frequency signals would be broadcast within vacant slots between adjacent channels in the existing broadcast band (interstitial approach) or within the same frequency channel allocations currently used by commercial broadcasters (in-band on-channel approach). The in-band approach may be implemented without the need for additional frequency coordination and with relatively minor changes to existing transmitting equipment. Of course, any digital audio broadcasting (DAB) technique should not degrade reception by conventional analog receiver circuits.

The use of digital audio broadcasting in the AM band (530 kHz to 1700 kHz) would provide AM broadcasting stations with a means to compete with high quality portable audio sources such as cassette tapes and compact disc players. It would therefore be desirable to extend the in-band on-channel (IBOC) approach to AM broadcasting frequencies to provide enhanced fidelity through digital signaling without affecting reception by existing analog AM receivers.

SUMMARY OF THE INVENTION

The broadcasting method of this invention utilizes a composite waveform comprising: an amplitude modulated radio frequency signal, wherein the amplitude modulated radio frequency signal includes a first carrier at a frequency of $f_0$, amplitude modulated by an analog signal representative of program material; and a plurality of digitally modulated orthogonal frequency division multiplexed (OFDM) carrier signals, with the OFDM carrier signals being within a frequency range of about $f_0 \pm 15$ kHz, each of the digitally modulated carrier signals being digitally modulated by a portion of a digital signal, wherein the digital signal includes a digital representation of the program material, additional data, or a combination of the program material and the additional data. A first group of the digitally modulated carrier signals overlap the frequency spectrum of the analog amplitude modulated radio frequency signal and are modulated in-quadrature with the first carrier signal. Second and third groups of the digitally modulated carrier signals lie outside of the frequency spectrum of the analog amplitude modulated radio frequency signal and are modulated both in-phase and in-quadrature with the first carrier signal. A training sequence of known data is periodically transmitted using selected ones of the digitally modulated carrier signals. The program material may be signals representing talk or music as typically broadcast on commercial AM radio stations.

The invention also encompasses a radio frequency transmitter comprising: means for transmitting a composite radio frequency signal, having an amplitude modulated signal including a first carrier at a frequency of $f_0$, amplitude modulated by an analog signal representative of program material, and a plurality of orthogonal frequency division multiplexed (OFDM) carrier signals spaced at about 454 Hz, within a frequency range of about $f_0 \pm 15$ kHz, which encompasses the frequency spectrum of the amplitude modulated signal, each of the digitally modulated OFDM carrier signals being digitally modulated by a portion of a digital signal, wherein the digital signal includes a digital representation of the program material, additional data, or a combination of the program material and the additional data. A first group of the digitally modulated carrier signals overlap the frequency spectrum of the analog amplitude modulated signal and are modulated in-quadrature with the first carrier signal. Second and third groups of the digitally modulated carrier signals lie outside of the frequency spectrum of the analog amplitude modulated signal and are modulated both in-phase and in-quadrature with the first carrier signal.

The invention further encompasses a radio frequency receiver comprising: means for receiving both analog and digital portions of a composite radio frequency waveform, wherein the waveform includes a first signal having a first carrier at a frequency of $f_0$, amplitude modulated by an analog signal representative of program material, and a plurality of orthogonal frequency division multiplexed (OFDM) carrier signals, within a frequency range of about $f_0 \pm 15$ kHz, which encompasses the frequency spectrum of the amplitude modulated radio frequency signal, each of the digitally modulated carrier signals being digitally modulated by a portion of a digital signal, wherein the digital signal includes a digital representation of the program material, additional data, or a combination of the program material and the additional data. A first group of the digitally modulated carrier signals overlap the frequency spectrum of the first signal and are modulated in-quadrature with the first carrier. Second and third groups of the digitally modulated carrier signals lie outside of the frequency spectrum of the first signal and are modulated both in-phase and in-quadrature with the first carrier. The analog signal on the first carrier and the digital signal on the digitally modulated carriers are demodulated and an output signal is produced.

This invention provides an in-band on-channel broadcasting method by which digital representations of audio programming material, or other digital data, can be transmitted within an existing AM broadcast channel without adversely affecting existing analog AM receivers and with relatively minor modifications to existing AM transmitting equipment. Transmitters and receivers that transmit and receive signals in accordance with the broadcasting method are also encompassed by this invention.

BRIEF DESCRIPTION OF THE DRAWINGS

The invention will be more readily apparent to those skilled in the art by reference to the accompanying drawings wherein.

DESCRIPTION OF THE PREFERRED EMBODIMENTS

This invention provides a method of simultaneously broadcasting both an analog amplitude modulated signal and a digital signal on the same channel assignment as the existing analog AM broadcasting allocation. When this technique is applied to AM radio broadcasts, the broadcasting can be done in the same frequency band and at the same carrier frequencies that are currently allocated for AM broadcasting. The technique of broadcasting the digital signal in the same channel as an analog AM signal is called in-band on-channel (IBOC) broadcasting. The need to prevent mutual interference places restrictions on the digital waveform that is placed beneath the analog AM spectrum. This broadcasting is accomplished by transmitting a digital waveform by way of a plurality of orthogonal frequency division modulated (OFDM) carriers, some of which are modulated in-quadrature with the analog AM signal and are positioned within the spectral region where the standard AM broadcasting signal has significant energy. The remaining digital carriers are modulated both in-phase and in-quadrature with the analog AM signal and are positioned in the same channel as the analog AM signal, but in spectral regions where the analog AM signal does not have significant energy. There are various methods for producing orthogonally related signals. The specific method employed to ensure this orthogonality condition is not a part of this invention. In the United States, the emissions of AM broadcasting stations are restricted in accordance with Federal Communications Commission (FCC) regulations to lie within a signal level mask defined such that: emissions 10.2 kHz to 20 kHz removed from the analog carrier must be attenuated at least 25 dB below the unmodulated analog carrier level, emissions 20 kHz to 30 kHz removed from the analog carrier must be attenuated at least 35 dB below the unmodulated analog carrier level, and emissions 30 kHz to 60 kHz removed from the analog carrier must be attenuated at least 35 dB+1 dB/kHz below the unmodulated analog carrier level.

Figure 1:
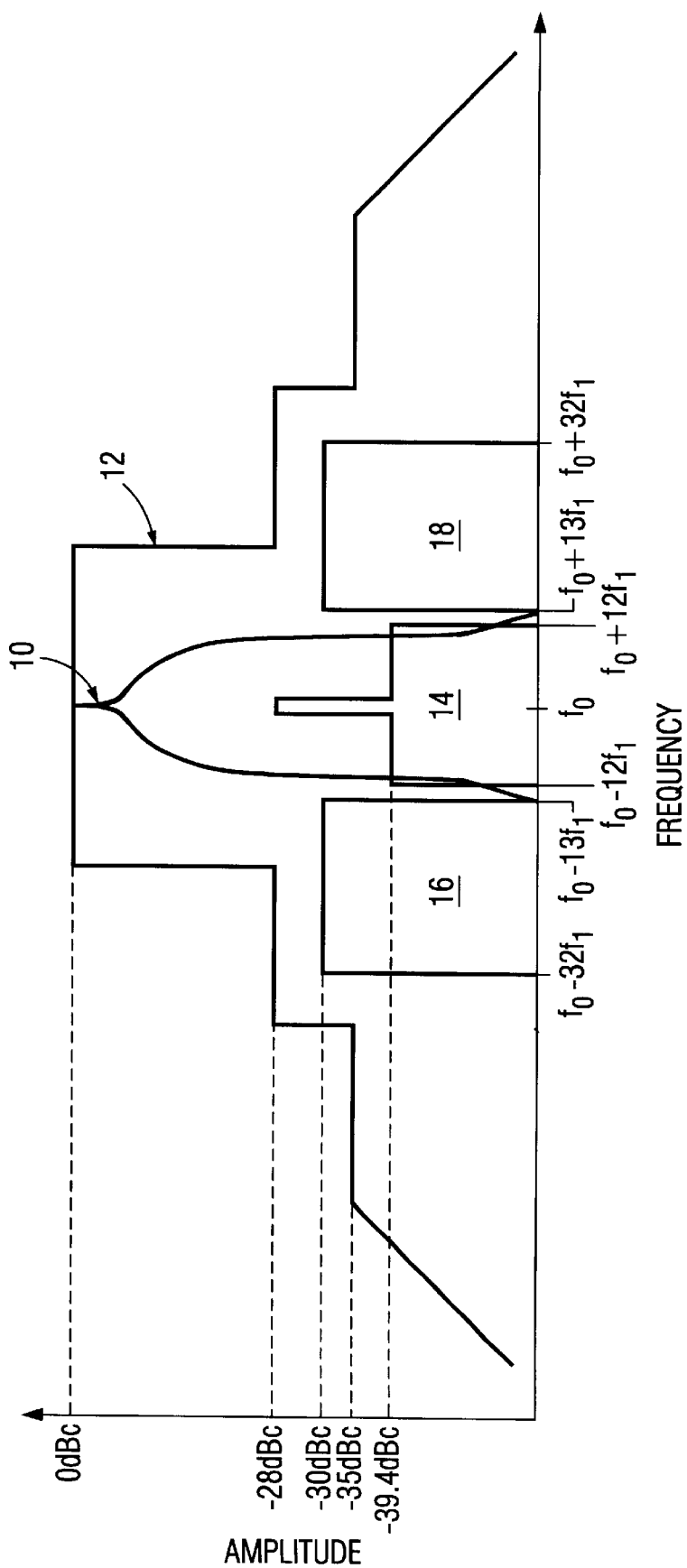
FIG. 1 is a spectral representation of a composite analog AM and digital broadcasting signal having carriers positioned in accordance with the present invention.

FIG. 1 shows the spectrum of an AM digital audio broadcasting signal having carriers positioned in accordance with the present invention. Curve 10 represents the standard broadcasting amplitude modulated signal, wherein the carrier has a frequency of $f_0$. The FCC emissions mask is represented by item number 12. Recent advances in source coding, such as the coding techniques known as MPEG Advanced Audio Coding, have shown that enhanced audio quality for stereo program material can be achieved by broadcasting digital signals at rates as low as 48 kilobits per second (kbps). Encoding rates of 32 and 16 kbps can also be transmitted. These lower encoding rates allow broadcasters to trade off audio quality for robustness of the signal coverage area. Waveforms which support this data rate can be inserted within the FCC emissions mask presently allocated for AM stations by employing bandwidth efficient modulation techniques.

The digitally modulated carriers in this invention are generated via orthogonal frequency division multiplexing (OFDM). This format enables the spectra of these carriers to be overlapped without any intervening guard bands, thereby optimizing spectral utilization. However, a guard interval can be used in the time domain to compensate for signal timing jitter and inter-symbol interference. The OFDM modulation technique is extremely beneficial for successful DAB operation since bandwidth is a premium commodity in the AM band. An additional advantage is that there is no need to isolate the DAB digital carriers from each other via filtering in either the transmitter or receiver since the orthogonality condition of OFDM minimizes such interference.

The OFDM waveform is composed of a series of data carriers spaced at $f_1 = 59.535 \cdot 10^6/(131072)$, or about 454 Hz.

The OFDM modulation produces tight spectral containment and enables the AM DAB waveform to extend extremely close to the edge of the FCC emissions mask, yet remain compliant. An additional feature of this approach is that the amplitude of each carrier can be tailored to boost signal power in areas where high interference levels are anticipated, such as locations close to the carrier frequencies of interferers. This strategy produces an optimal allocation of signal energy and thereby maximizes the potential AM DAB coverage region. The carrier spacing was chosen based on several constraints. Closer carrier spacing results in longer data bauds. Signal tracking loops are updated at the end of each baud. If the bauds are too long, tracking problems can occur. In addition, if the carriers are too far apart, and if the channel has significant variations across a baud, equalization in the frequency domain may not be sufficient, requiring the use of equalization in the time domain. A larger carrier spacing also results in less spectral containment and increased interference from other stations. A carrier spacing close to 500 Hz has been found to be appropriate for AM channels. The exact carrier spacings were chosen such that a single frequency source could be used in an AM and FM DAB system to generate all needed clocking signals. An additional constraint was that 44.1 kHz should be a sub-multiple of the frequency source so that when receivers also incorporate CD players, a clocking signal can easily be provided for the CD player and common digital tone control circuitry can be used for the received AM and FM signals and the CD signal. Another constraint was that the single frequency source would be at a commonly available frequency for low-cost frequency sources that would be used in a receiver. There was also a constraint that the guard time for the AM and FM systems should be on the order of 100 $\mu$s. Another constraint was to have a digital carrier position located near 10 kHz so that interference from first adjacent channels could be minimized by not transmitting the digital carriers +/−10 kHz from the analog AM carrier. Also, it was desireable for the AM and FM bauds to have a number of samples equal to a power of 2 to facilitate efficient computation by an FFT. It was found that the above constraints could be satisfied by choosing an AM carrier spacing of 454.21600341796875 Hz, an AM sampling rate of 58,139.6484375 Hz, an AM guard band of 7 samples, and 128 samples in an AM baud excluding guard band samples. Using these parameters, a frequency source of 59.535 MHz or half that rate can be used for all clocking functions needed for the AM and FM DAB systems.

In this invention, the composite analog and digital DAB waveform includes a plurality of modulated carriers which are fully compliant with the FCC emissions mask. In the preferred embodiment of this invention, 62 carriers, spaced about 454 Hz apart, are used to carry the digital information. A first group of twenty four of the digitally modulated carriers are positioned within a frequency band extending from $(f_0-12 f_1)$ to $(f_0+12 f_1)$, as illustrated by the envelope labeled 14 in FIG. 1. Most of these signals are placed 39.4 dB lower than the level of the unmodulated AM carrier signal in order to minimize crosstalk with the analog AM signal. Crosstalk is further reduced by encoding this digital information in a manner that guarantees orthogonality with the analog AM waveform. This type of encoding is called complementary encoding (i.e. complementary BPSK, complementary 8 PSK, or complementary 32 QAM). Complementary BPSK modulation is employed on the innermost digital carrier pair at $f_0+/-f_1$ to facilitate timing recovery via a Costas loop. These carriers are set at a level of −28 dBc. All other carriers in this first group have a level of −39.4 dBc and are modulated using complementary 32 QAM for the 48 and 32 kbps encoding rates. Complementary 8 PSK modulation is used on carriers ranging from $(f_0-11\ f_1)$ to $(f_0-2\ f_1)$ and from $(f_0+2\ f_1)$ to $(f_0+11\ f_1)$ for a 16 kbps encoding rate. For all three encoding rates, the carriers at $(f_0-12\ f_1)$ and $(f_0+12\ f_1)$ carry supplementary data and are modulated using complementary 32 QAM. These two Additional groups of digital signals are placed outside the first group. The need for these digital waveforms to be in-quadrature with the analog signal is eliminated by restricting the analog AM signal bandwidth. This is not anticipated to be an unreasonable requirement since the ceramic IF filters typically found in analog AM receivers limit the audio response to 3.5 kHz. All of the carriers in a second and a third group, encompassed by envelopes 16 and 18 respectively, are modulated using 32 QAM for the 48 and 32 kbps rates and 8 PSK for the 16 kbps rate. The carriers are set at levels of −30 dBc for all encoding rates. The carriers at $(f_0-22\ f_1)$ and $(f_0+22\ f_1)$, which are very close to $f_0$10 kHz and $f_0$+10 kHz, respectively, are not transmitted because these carriers are particularly susceptible to interference from first adjacent channel stations.

Figure 2:
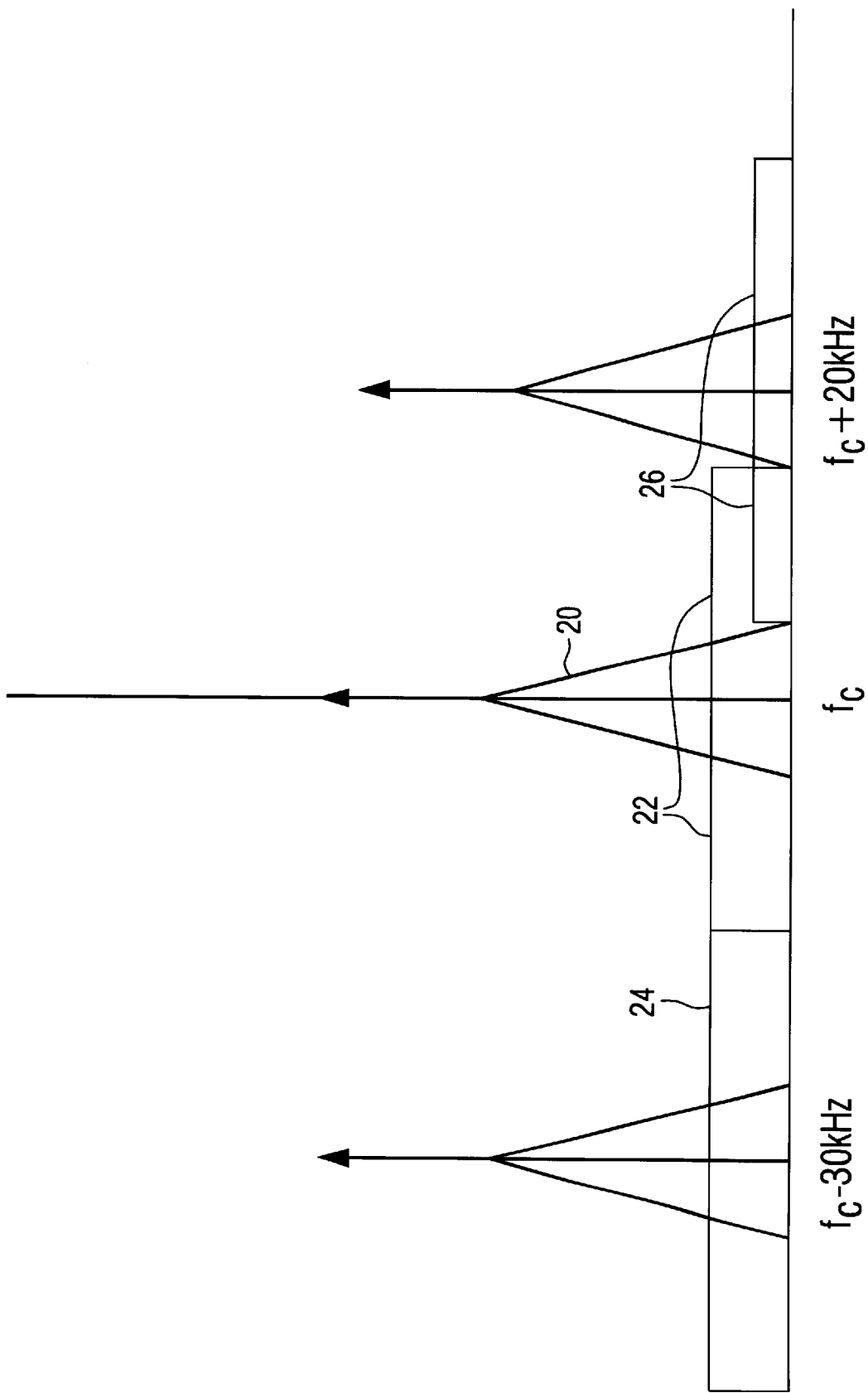
FIG. 2 is a spectral representation of adjacent channel interference scenarios.

By restricting the digitally modulated carriers to a frequency band of $f_0\pm15$ kHz, interference is reduced from and to other broadcast stations. FIG. 2 illustrates this using a scenario of a desired station with a center frequency of $f_c$, a lower third adjacent interferer at $f_c-30$ kHz, and an upper second adjacent interferer at $f_c+20$ kHz. The analog spectrum 20 of the desired station extends from approximately $f_c\pm5$ kHz. The digital spectrum 22 of the desired signal extends from approximately $f_c\pm15$ kHz. As illustrated in FIG. 2 by the digital spectrum 24 of a lower third adjacent interferer, when an interferer is located 30 kHz away from the desired station, the digital carriers do not overlap, thereby mitigating interference between the stations. If the digital bandwidth were made larger than $f_c\pm15$ kHz, there would be interference between stations having center frequencies located 30 kHz apart. It is important to avoid this situation because the level of third adjacent interferers is typically much higher than for co, first, or second adjacent channel interferers. Also, as illustrated in FIG. 2 by the digital component 26 of an upper second adjacent interferer, when the digital bandwidth is limited to $f_c\pm15$ kHz and the analog bandwidth is limited to $f_c\pm5$ kHz, there is no overlap of the digital portion of a station with the analog portion of another station or from the analog portion of a station to the digital portion of another station when the center frequencies of the stations are 20 kHz apart.

Figure 3:
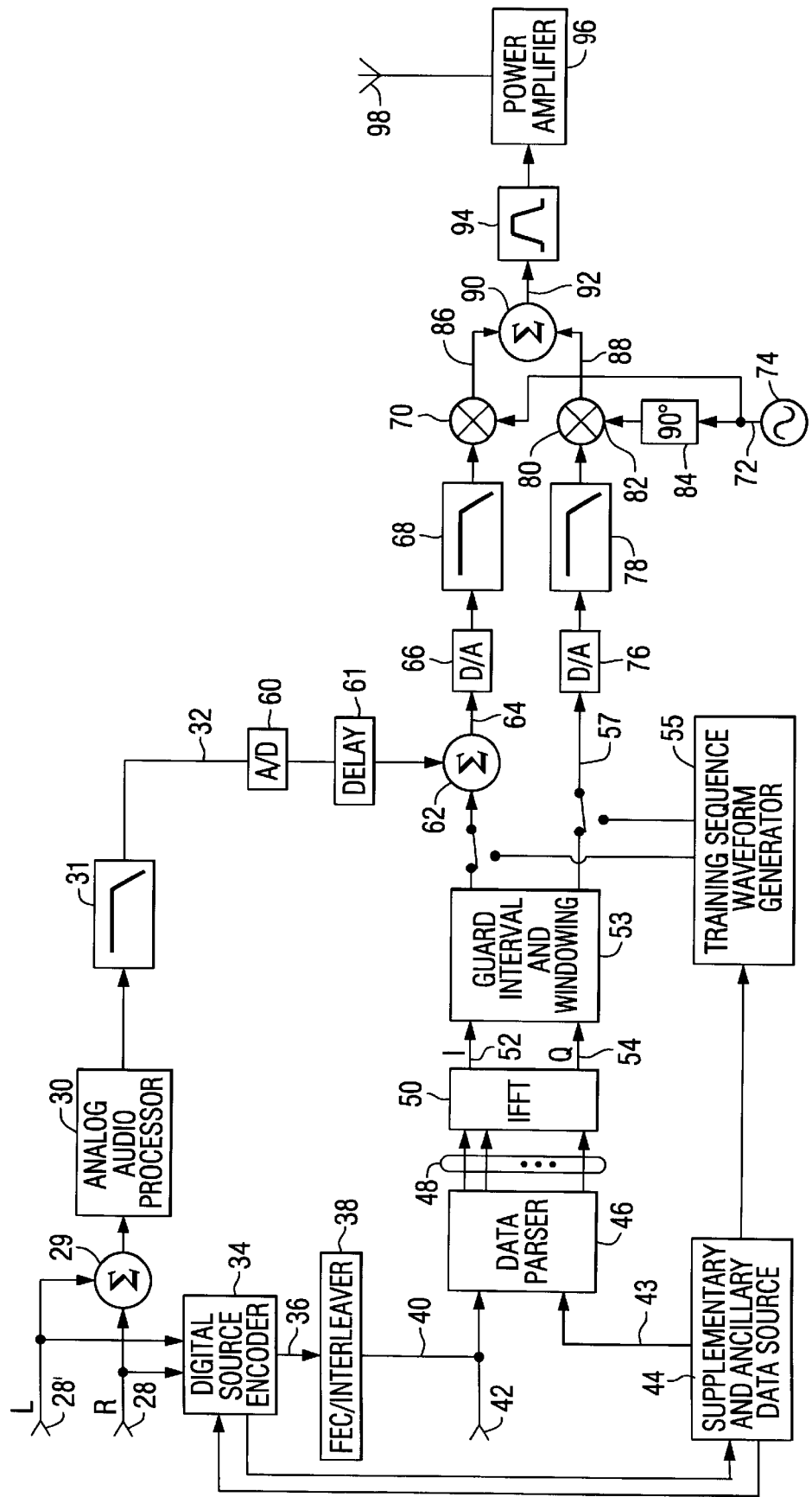
FIG. 3 is a block diagram of a transmitter constructed in accordance with this invention.

FIG. 3 is a block diagram of a transmitter constructed in accordance with this invention. An analog program signal (which in this example includes right and left stereo portions) that is to be transmitted is impressed onto input terminals 28 and 28'. The left and right channels are combined in summation point 29 and then fed through an analog audio processor 30 to increase the average analog AM modulation, which extends the coverage region considerably. Such processors are commonplace at analog AM radio stations throughout the world. That signal is passed through a low pass filter 31 having a sharp cutoff characteristic, to produce a filtered monaural analog program signal on line 32. Filter 31 may, for example, have a cutoff frequency of 5 kHz and 40 dB attenuation beyond 5.5 kHz. Optionally, the effect of filter 31 may be achieved by audio processing within analog audio processor 30.

For those applications in which the analog and digital portions of the transmitted signal will be used to convey the same program material, a digital source encoder 34, which may implement the encoding algorithm, converts the right and left analog program signals to a digital signal on line 36. A forward error correction and interleaver circuit 38 improves data integrity over channels corrupted with impulsive noise and interference, producing a digital signal on line 40. For those instances where the digital signal to be transmitted is not a digital version of the analog program signal, a data port 42 is provided to receive the digital signal. A supplementary and ancillary data source 44 is also provided for those instances in which the digital version of the analog program signal, or a digital signal supplied to port 42, is to be supplemented by including additional data. A portion of the ancillary data can be input to the digital source encoder 34. The source encoder may reserve a portion of its output bits for the transfer of ancillary data. Also, if the audio source does not require the full encoding rate of the source encoder, for instance during non-complex musical passages, the encoder can, on an as available basis, transmit ancillary data. When the source encoder does not require the full encoding rate and can transmit ancillary information in addition to the reserved ancillary data, the source encoder could indicate this condition to the ancillary data source by sending a signal to the ancillary data source, where the signal indicates the amount of additional data that can be transmitted. Ancillary data could be used to transmit signals such as emergency information, stock market quotes, weather forecasts, or information related to the audio program material such as the title of a song.

Data parser 46 receives the digital data and produces a plurality of outputs on lines 48. Supplementary data that is used on carriers $(f_0-12\ f_1)$ and $(f_0+12\ f_1)$ is input on line 43. The signals on pairs of lines 48 from the data parser 46 constitute complex coefficients that are in turn applied to an Inverse Fast Fourier Transform (IFFT) algorithm in block 50, which generates the baseband in-phase, I, and quadrature, Q, components of the data signal, on lines 52 and 54 respectively. A guard band is applied to the output of the IFFT by processor 53. When the IFFT output consists of 128 samples per IFFT operation, the guard band consists of 7 samples. The guard band is applied by periodically extending the IFFT output, or in other words, taking samples 1 through 7 and replicating them as samples 129 through 135, respectively. Following the guard band, a window is applied to the data. The window reduces interference to second and third adjacent stations by reducing the sidelobes in the transmitted spectrum.

Periodically, instead of transmitting encoded program data or ancillary data, a training sequence, also commonly known as pilot information, which is known data, is sent. The training sequence allows processors in the receiver such as the equalizer to acquire the signal rapidly and follow rapidly changing channel conditions. The training sequence can be stored in, or generated by, device 55 and periodically selected as the transmitted waveform, for example, every tenth frame. Alternatively, information for the training sequence could be stored in the frequency domain and applied to the input of the IFFT. However, storing the information in the time domain reduces the required number of IFFT operations. Although known data is sent every tenth frame, the carriers devoted to the transmission of supplementary data, $(f_0-12\ f_1)$ and $(f_0\ +12\ f_1)$, may not transmit known data every tenth frame. In this case, the supplementary data to be sent every tenth frame is input to the training sequence waveform generator and the contribution of the carriers devoted to supplementary data is added to the known data. The difference between the supplementary and ancillary data is that the supplementary data processing is completely independent of the source encoding, FEC, and interleaving operations that are used to process the digitally encoded program information.

The processed baseband analog AM signal is converted to a digital signal by analog-to-digital converter 60 and is delayed by delay device 61. Delay of the analog signal at the transmitter provides time diversity between the analog and digital signals in the channel. Time diversity leads to the opportunity for robust blending between the analog and digital signals. The delayed analog signal is combined with the in-phase portion of the digital DAB waveform at summation point 62 to produce a composite signal on line 64. The composite signal on line 64 is converted to an analog signal by digital-to-analog converter 66, filtered by low pass filter 68, and passed to a mixer 70 where it is combined with a radio frequency signal produced on line 72 by a local oscillator 74. The quadrature signal on line 57 is converted to an analog signal by digital-to-analog converter 76 and filtered by low pass filter 78 to produce a filtered signal which is combined in a second mixer 80, with a signal on line 82. The signal on line 72 is phase shifted as illustrated in block 84 to produce the signal on line 82. The outputs of mixers 70 and 80 are delivered on lines 86 and 88 to a summation point 90 to produce a composite waveform on line 92. The spurious mixing products are muted by band-pass filter 94, and the resulting DAB signal is subsequently amplified by a power amplifier 96 for delivery to a transmitting antenna 98.

Figure 4:
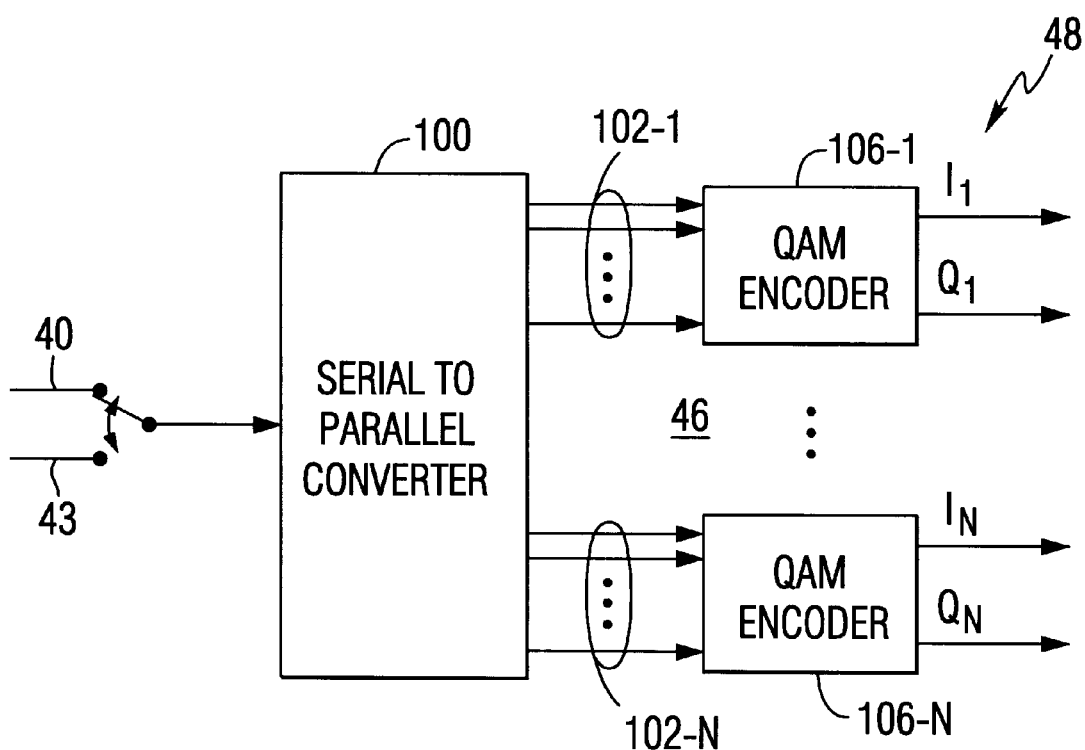
FIG. 4 is a block diagram of a data parser used in the transmitter of FIG. 3.

FIG. 4 is a block diagram of the data parser 46 of FIG. 3. The data parser includes a serial-to-parallel converter 100 which receives serial inputs, as illustrated by the input lines 40 and 43, and produces a plurality of outputs in the form of digital signals on a plurality of groups of lines as illustrated by groups 102-1 to 102-N. Each group of lines feeds a QAM encoder, such as encoders 106-1 to 106-N to produce complex frequency domain coefficients $I_1$ to $I_N$ and $Q_1$ to $Q_N$ that are input to the IFFT operation. In a practical application there may be, for example, 5 lines per group and 62 QAM encoders. In addition, some QAM encoders may use BPSK, QPSK, 8 PSK, 16 QAM or other types of modulation.

Figure 5:
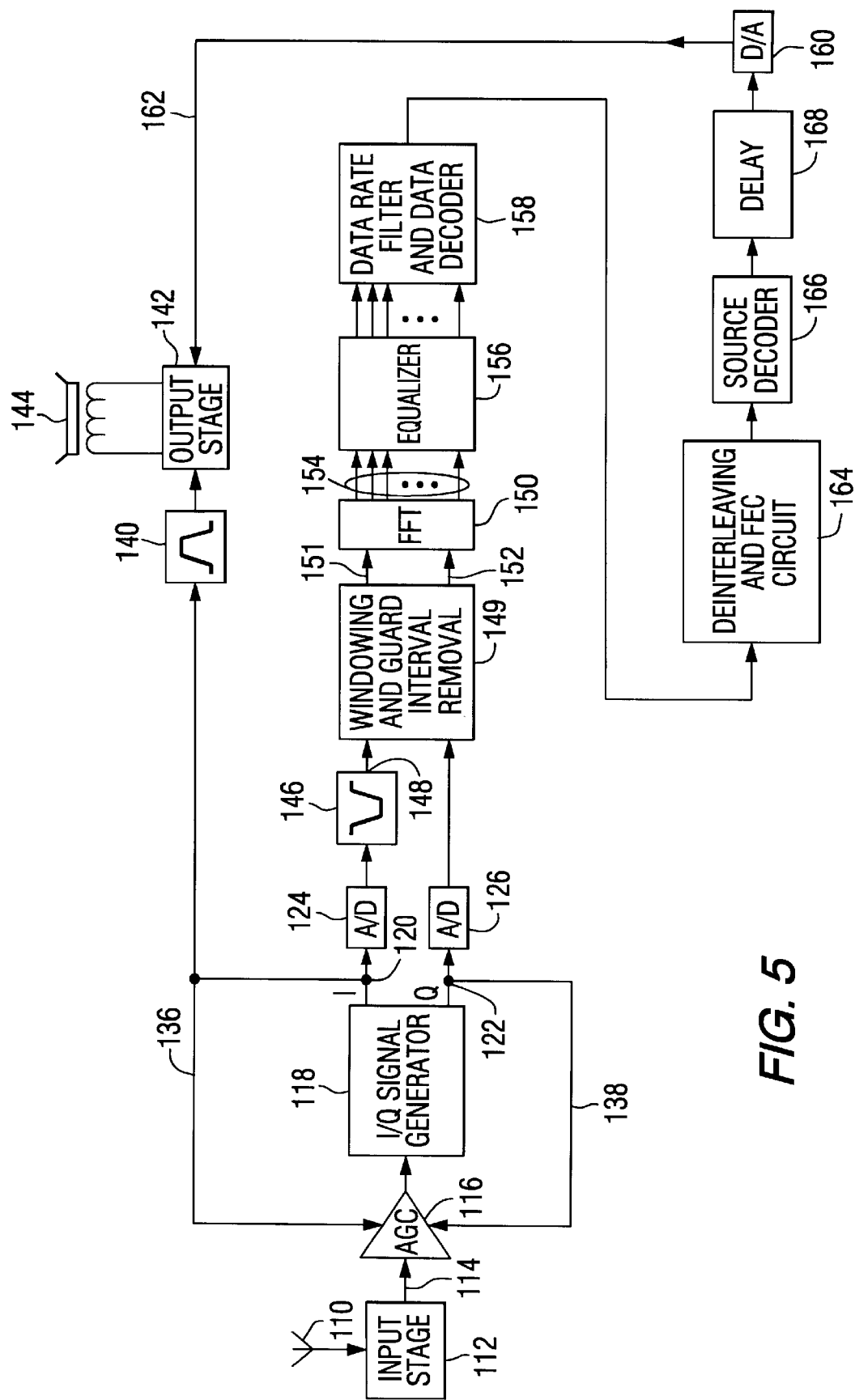
FIG. 5 is a block diagram of a receiver constructed in accordance with this invention.

FIG. 5 is a block diagram of a receiver constructed to receive digital and analog signals broadcast in accordance with this invention. An antenna 110 receives the composite waveform containing the digital and analog signals and passes the signal to conventional input stages 112, which may include a radio frequency preselector, an amplifier, a mixer and a local oscillator. An intermediate frequency signal is produced by the input stages on line 114. This intermediate frequency signal is passed through an automatic gain control circuit 116 to an I/Q signal generator 118. The I/Q signal generator produces an in-phase signal on line 120 and a quadrature signal on line 122. The phase relationship of these signals is governed by the phase of the analog AM carrier, such that the in-phase signal contains the analog signal components along with some of non-complementary digital signal components, and the quadrature signal contains the complementary digital signal components and the non-complementary digital signal components not contained in the in-phase signal. The in-phase channel output on line 120 is input to an analog-to-digital converter 124. Similarly, the quadrature channel output on line 122 is input to another analog-to-digital converter 126. Feedback signals on lines 136 and 138 are used to control the automatic gain control circuit 116. The signal on line 136 includes the analog AM signal which is separated out as illustrated by block 140 and passed to an output stage 142 and subsequently to a speaker 144 or another output device.

An optional highpass filter 146 filters the in-phase components on line 128 to eliminate the energy of the analog AM signal and to provide a filtered signal on line 148. A windowing and guard interval removal function is performed on the I and Q signal components as illustrated by block 149. The windowing functions in the transmitters and receivers complement each other. Specifically, a root raised cosine window is applied at the transmitter and receiver on the first and last 7 samples in a baud. The window has an excess Nyquist time (as opposed to an excess Nyquist bandwidth for the typical case where the window is applied in the frequency domain) of 7/128. When the last seven samples are added to the first seven samples (sample 129 is added to sample 1, sample 130 is added to sample 2, and so on until sample 135 is added to sample 7) following windowing at the receiver, the orthogonality property between the digital carriers is maintained. A Fast Fourier Transform circuit (FFT) 150 receives the digital signals on lines 151 and 152, and produces output signals on lines 154. These output signals are passed to an equalizer 156 and to a data rate filter and data decoder 158. The output of the data decoder is sent to a deinterleaving circuit and forward error correction decoder 164 in order to improve data integrity. The output of the deinterleaver/forward error correcting circuit is passed to a source decoder 166. The output of the source decoder is delayed by circuit 168 to compensate for the delay of the analog signal at the transmitter and to time align the analog and digital signals at the receiver. The output of delay circuit 168 is converted to an analog signal by a digital-to-analog converter 160 to produce a signal on 162 which goes to the output stage 142. The front end components of the receiver of FIG. 5 are an example of the type of components that might provide an input to the windowing function block, however, these particular components do not form part of the present invention.

The present invention utilizes an AM DAB waveform that minimizes the magnitude of changes necessary to convert existing AM radio stations to DAB because the bandwidth is completely within the FCC emissions mask for AM transmission. Therefore, it is expected that broadcasters can retain their existing transmit antennas. Their feed networks may need to be updated, however, since group delay variation in the channel needs to be reasonably constant to minimize intersymbol interference for the digital signal, a consideration that was less critical for analog AM transmissions. It is suspected that existing analog AM transmitters can be retained, provided that the power amplifier is operated in a reasonably linear mode. The primary hardware alteration would be to replace the low level carrier input with an AM DAB exciter. This module generates both the analog and digital portions of the AM DAB modulation and the transmitter therefore functions primarily as a linear amplifier.

Although the present invention has been described in terms of an AM digital audio broadcasting system, it should be understood that the technique could be applied to any system that transmits digital signals along with analog amplitude modulated signals. Similarly, it should be understood that the functions illustrated by various blocks in the drawings may be combined and/or performed substantially by digital signal processing software. Furthermore, it should be understood that the information sent by the digital signal can be different from the information sent by the analog amplitude modulated signal. Therefore the methods of this invention can be used to transmit data of various types, such as traffic or weather information, video signals or military communication signals, in combination with an amplitude modulated signal. Potential application areas include amplitude modulated military communications, and television signals in which the video information is amplitude modulated.

We claim:

1. A radio frequency broadcasting method, said method comprising the steps of:

amplitude modulating a first carrier signal at a frequency of $f_0$ by an analog signal representative of program material, to generate a first radio frequency signal having a first frequency spectrum;

producing a digital signal including a plurality of digital words representative of said program material, additional data, or a combination of said program material and said additional data;

applying a raised root cosine window to a predetermined number of first and last samples in data words in the digital signal;

generating a plurality of digitally modulated orthogonal frequency division multiplexed (OFDM) carrier signals, said digitally modulated OFDM carrier signals being within a frequency range of about $f_0 \pm 15$ kHz, each of said digitally modulated OFDM carrier signals being digitally modulated by a portion of the digital signal;

wherein a first group of said digitally modulated OFDM carrier signals overlap said first frequency spectrum and are modulated in-quadrature with said first carrier signal, and wherein second and third groups of said digitally modulated OFDM carrier signals lie outside of said first frequency spectrum and are modulated both in-phase and in-quadrature with said first carrier signal; and simultaneously broadcasting said first radio frequency signal and said plurality of digitally modulated OFDM carrier signals.

2. A radio frequency broadcasting method according to claim 1, further comprising the step of:

periodically transmitting a training sequence of known data using selected ones of said digitally modulated OFDM carrier signals.

3. A radio frequency broadcasting method according to claim 1, wherein the digitally modulated orthogonal frequency division multiplexed canier signals are spaced at about 454 Hz.

4. A radio frequency broadcasting method according to claim 1, further comprising the step of:

adding a temporal guard interval to data words representing the digital signal.

5. A radio frequency broadcasting method according to claim 1, further comprising the step of:

adjusting the quantity of the additional data in the digital signal in response to the complexity of the program material.

6. A radio frequency broadcasting method according to claim 1, wherein:

said first frequency spectrum extends between about plus and minus 5 kHz from said first carrier signal.

7. A radio frequency broadcasting method according to claim 1, wherein:

said digitally modulated OFDM carrier signals comprise 62 carriers.

8. A radio frequency broadcasting method according to claim 1, wherein:

said first group of digitally modulated OFDM carrier signals comprises 24 carriers.

9. A radio frequency broadcasting method according to claim 1, wherein:

the digitally modulated OFDM carrier signals in said first group of said digitally modulated OFDM carrier signals have amplitudes which are less than the unmodulated first carrier signal amplitude.

10. A radio frequency broadcasting method according to claim 9, wherein:

the digitally modulated OFDM carrier signals in said second and third groups of said digitally modulated OFDM carrier signals have amplitudes which are greater than the amplitude of a majority of the digitally modulated OFDM carrier signals in said first group of digitally modulated OFDM carrier signals.

11. A radio frequency broadcasting method according to claim 1, wherein:

said selected ones of said digitally modulated OFDM carrier signals are modulated by supplementary data.

12. A radio frequency broadcasting method according to claim 1, wherein carriers of said first group located closest to the frequency of $f_0$ are modulated using complementary BPSK modulation, remaining carriers in said first group are modulated using complementary 32-QAM modulation, and said second and third groups of said digitally modulated OFDM carrier signals are modulated in a 32-QAM constellation.

13. A radio frequency broadcasting method according to claim 1, wherein carriers of said first group located closest to the frequency of $f_0$ are modulated using complementary BPSK modulation, carriers of said first group located farthest from the frequency of $f_0$ are modulated using complementary 32 QAM modulation, remaining carriers in said first group are modulated using complementary 8 PSK modulation, and said second and third groups of said digitally modulated OFDM carrier signals are modulated in an 8 PSK constellation.

14. A radio frequency transmitter comprising:

means for amplitude modulating a first carrier signal at a frequency of $f_0$ by an analog signal representative of program material to generate a first radio frequency signal having a first frequency spectrum;

means for producing a digital signal including a plurality of digital words representative of said program material, and for applying a raised root cosine window to a predetermined number of first and last samples in data words in the digital signal;

means for generating a plurality of digitally modulated orthogonal frequency division multiplexed (OFDM) carrier signals, said digitally modulated OFDM carrier signals being within a frequency range of about $f_0 \pm 15$ kHz, each of said digitally modulated OFDM carrier signals being digitally modulated by a portion of the digital signal;

wherein a first group of said digitally modulated OFDM carrier signals overlap said first frequency spectrum and are modulated in-quadrature with said first carrier signal, and wherein second and third groups of said digitally modulated OFDM carrier signals lie outside of said first frequency spectrum and are modulated both in-phase and in-quadrature with said first carrier signal; and means for simultaneously broadcasting said first radio frequency signal and said plurality of digitally modulated OFDM carrier signals.

15. A radio frequency transmitter according to claim 14, further comprising:
   means for periodically transmitting a training sequence of known data using selected ones of said digitally modulated OFDM carrier signals.

16. A radio frequency transmitter according to claim 14, wherein said digitally modulated orthogonal frequency division multiplexed carrier spaces are spaced about 454 Hz apart.

17. A radio frequency transmitter according to claim 14, further comprising:
   means for adding a temporal guard interval to data words representing the digital signal.

18. A radio frequency transmitter according to claim 14, wherein the plurality of digital words produced by the means for producing a digital signal are further representative of additional data, or a combination of said program material and said additional data, and wherein the means for producing a digital signal further adjusts the quantity of the additional data in the digital signal in response to the complexity of the program material.

19. A radio frequency transmitter according to claim 14, wherein:
   said first frequency spectrum extends between about plus and minus 5 kHz from said first carrier.

20. A radio frequency transmitter according to claim 14, wherein:
   said digitally modulated OFDM carrier signals comprise 62 carriers.

21. A radio frequency transmitter according to claim 14, wherein:
   said first group of digitally modulated OFDM carrier signals comprises 24 carriers.

22. A radio frequency transmitter according to claim 14, wherein:
   the digitally modulated OFDM carrier signals in said first group of said digitally modulated OFDM carrier signals have amplitudes which are less than the unmodulated first carrier signal amplitude.

23. A radio frequency transmitter according to claim 14, wherein:
   the digitally modulated OFDM carrier signals in said second and third groups of said digitally modulated OFDM carrier signals have amplitudes which are greater than the amplitude of a majority of the digitally modulated OFDM carrier signals in said first group of digitally modulated OFDM carrier signals.

24. A radio frequency transmitter according to claim 14, wherein:
   said selected ones of said digitally modulated OFDM carrier signals are modulated by supplementary data.

25. A radio frequency transmitter according to claim 14, wherein carriers of said first group located closest to the frequency of $f_0$ are modulated using complementary BPSK modulation, remaining carriers in said first group are modulated using complementary 32-QAM modulation, and said second and third groups of said digitally modulated OFDM carrier signals are modulated in a 32-QAM constellation.

26. A radio frequency transmitter according to claim 14, wherein carriers of said first group located closest to the frequency of $f_0$ are modulated using complementary BPSK modulation, carriers of said first group located farthest from the frequency of $f_0$ are modulated using complementary 32 QAM modulation, remaining carriers in said first group are modulated using complementary 8 PSK modulation, and said second and third groups of said digitally modulated carrier OFDM signals are modulated in an 8 PSK constellation.

27. A radio frequency receiver comprising:
   means for receiving a first carrier signal at a frequency of $f_0$ and amplitude modulated by an analog signal representative of program material forming a first radio frequency signal having a first frequency spectrum, and a plurality of digitally modulated orthogonal frequency division multiplexed (OFDM) carrier signals, said OFDM carrier signals being within a frequency range of about $f_0 \pm 15$ kHz, each of said digitally modulated carrier signals being digitally modulated by a portion of a digital signal, said digital signal including a digital representation of said program material, additional data, or a combination of said program material and said additional data, wherein a first group of said digitally modulated carrier signals overlap said first frequency spectrum and are modulated in-quadrature with said first carrier signal, and wherein second and third groups of said digitally modulated carrier signals lie outside of said first frequency spectrum and are modulated both in-phase and in-quadrature with said first carrier signal;
   means for detecting said analog signal and said digital signal;
   means for applying a raised root cosine window to a predetermined number of first and last samples in data words in the digital signal; and
   means for producing an output signal in response to said analog signal, said digital signal, or a combination of said analog signal and said digital signal.

28. A radio frequency receiver according to claim 27, wherein said means for detecting said digital signal uses the phase of said first carrier signal as a phase reference to demodulate said digitally modulated carriers.

29. A radio frequency transmitter comprising:
   first and second mixers for amplitude modulating a first carrier signal at a frequency of $f_0$ by an analog signal representative of program material to generate a first radio frequency signal having a first frequency spectrum, and for generating a plurality of digitally modulated orthogonal frequency division multiplexed (OFDM) carrier signals, said digitally modulated OFDM carrier signals being within a frequency range of about $f_0 \pm 15$ kHz, each of said digitally modulated OFDM carrier signals being digitally modulated by a portion of a digital signal, said digital signal including data words representative of said program material, said data words being windowed by applying a raised root cosine window to a predetermined number of first and last samples in the data words;
   wherein a first group of said digitally modulated OFDM carrier signals overlap said first frequency spectrum and are modulated in-quadrature with said first carrier signal, and wherein second and third groups of said digitally modulated OFDM carrier signals lie outside of said first frequency spectrum and are modulated both in-phase and in-quadrature with said first carrier signal;
   a digital source encoder for adjusting the quantity of the additional data in response to the complexity of the program material; and
   an antenna for simultaneously broadcasting said first radio frequency signal and said plurality of digitally modulated OFDM carrier signals.

30. A radio frequency transmitter according to claim 29, further comprising:
   a training sequence waveform generator for periodically transmitting a training sequence of known data using selected ones of said digitally modulated OFDM carrier signals.

31. A radio frequency transmitter according to claim 29, wherein said digitally modulated orthogonal frequency division multiplexed carrier spaces are spaced about 454 Hz apart.

32. A radio frequency transmitter according to claim 29, further comprising:

a processor for adding a temporal guard interval to data words representing the digital signal.

33. A radio frequency transmitter according to claim 32, wherein the data words further include additional data, or a combination of said program material and said additional data.

34. A radio frequency transmitter according to claim 29, wherein:

said first frequency spectrum extends between about plus and minus 5 kHz from said first carrier signal.

35. A radio frequency transmitter according to claim 29, wherein:

said digitally modulated OFDM carrier signals comprise 62 carriers.

36. A radio frequency transmitter according to claim 29, wherein:

said first group of digitally modulated OFDM carrier signals comprises 24 carriers.

37. A radio frequency transmitter according to claim 29, wherein:

the digitally modulated OFDM carrier signals in said first group of said digitally modulated OFDM carrier signals have amplitudes which are less than the unmodulated first carrier signal amplitude.

38. A radio frequency transmitter according to claim 29, wherein:

the digitally modulated OFDM carrier signals in said second and third groups of said digitally modulated OFDM carrier signals have amplitudes which are greater than the amplitude of a majority of the digitally modulated OFDM carrier signals in said first group of digitally modulated OFDM carrier signals.

39. A radio frequency transmitter according to claim 29, wherein:

said selected ones of said digitally modulated OFDM carrier signals are modulated by supplementary data.

40. A radio frequency transmitter according to claim 29, wherein carriers of said first group located closest to the frequency of $f_0$ are modulated using complementary BPSK modulation, remaining carriers in said first group are modulated using complementary 32-QAM modulation, and said second and third groups of said digitally modulated OFDM carrier signals are modulated in a 32-QAM constellation.

41. A radio frequency transmitter according to claim 29, wherein carriers of said first group located closest to the frequency of $f_0$ are modulated using complementary BPSK modulation, carriers of said first group located farthest from the frequency of $f_0$ are modulated using complementary 32 QAM modulation, remaining carriers in said first group are modulated using complementary 8 PSK modulation, and said second and third groups of said digitally modulated carrier OFDM signals are modulated in an 8 PSK constellation.

42. A radio frequency receiver comprising:

an input stage for receiving a first carrier signal at a frequency of $f_0$ and amplitude modulated by an analog signal representative of program material forming a first radio frequency signal having a first frequency spectrum, and a plurality of digitally modulated orthogonal frequency division multiplexed (OFDM) carrier signals, said digitally modulated OFDM carrier signals being within a frequency range of about $f_0 \pm 15$ kHz, each of said digitally modulated OFDM carrier signals being digitally modulated by a portion of a digital signal, said digital signal including a digital representation of said program material, wherein a first group of said digitally modulated OFDM carrier signals overlap said first frequency spectrum and are modulated in-quadrature with said first carrier signal, and wherein second and third groups of said digitally modulated OFDM carrier signals lie outside of said first frequency spectrum and are modulated both in-phase and in-quadrature with said first carrier signal, and for receiving a training sequence of known data on selected ones of said digitally modulated OFDM carrier signals;

a processing stage for detecting said analog signal and said digital signal and for applying a raised root cosine window to a predetermined number of first and last samples in data words representing the digital signal; and an output stage for producing an output signal in response to said analog signal, said digital signal, or a combination of said analog signal and said digital signal.

43. A radio frequency receiver according to claim 42, wherein the digital signal further includes a representation of additional data, or a combination of said program material and said additional data.

44. A radio frequency receiver according to claim 42, wherein said processing stage uses the phase of said first carrier signal as a phase reference to demodulate said digitally modulated OFDM carrier signals.

* * * * *

UNITED STATES PATENT AND TRADEMARK OFFICE
CERTIFICATE OF CORRECTION

PATENT NO. : 6,452,977 B1
DATED : September 17, 2002
INVENTOR(S) : Roy Don Goldstone, David Carl Hartup and Marcus McLean Matherne It is certified that error appears in the above-identified patent and that said Letters Patent is hereby corrected as shown below:

Title page,
Item [74], "*Attorney, Agent or Firm*", should read -- *Attorney, Agent or Firm* - Robert P. Lenart; Pietragallo, Bosick & Gordon --.

Column 4,
Line 55, "$(f_o-12fl)$" should read -- $(f_o-12f_1)$ --.

Column 5,
Line 8, "two" should read -- two carriers do not transmit audio or program material. Broadcasters may choose not to transmit these carriers. This would provide a reduction in interference to the analog signal. --.
Line 21, "$f_0$-10 kHz" should read -- $f_0$ -10 kHz --.

Column 9,
Line 46, "canier" should read -- carrier --.

Signed and Sealed this

Twelfth Day of October, 2004

JON W. DUDAS
*Director of the United States Patent and Trademark Office*